B. A. STOWE.
SUPPORT FOR ELECTRIC TRANSLATING DEVICES.
APPLICATION FILED APR. 15, 1912.
1,040,452.
Patented Oct. 8, 1912.
2 SHEETS—SHEET 1.
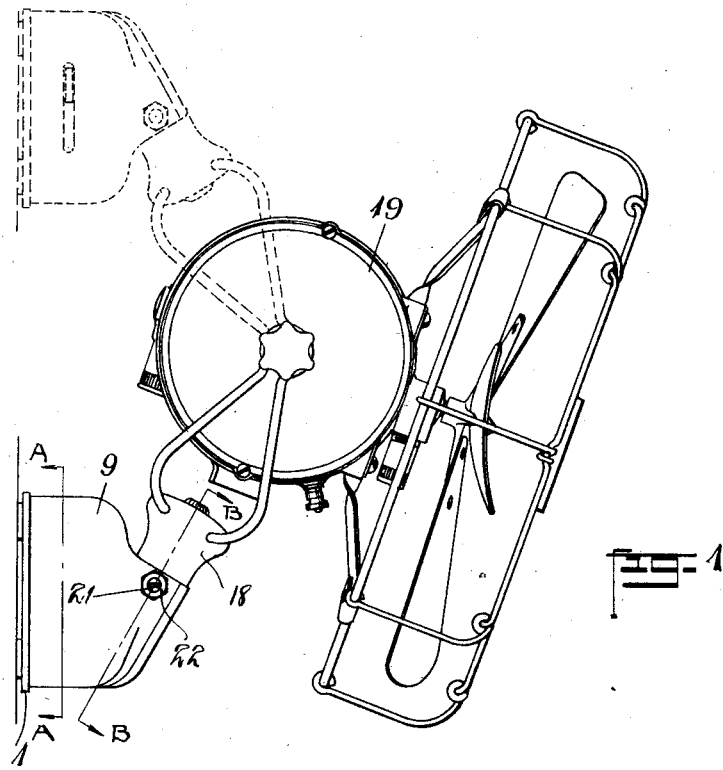
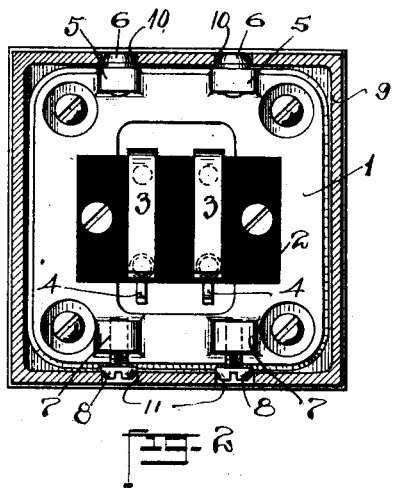
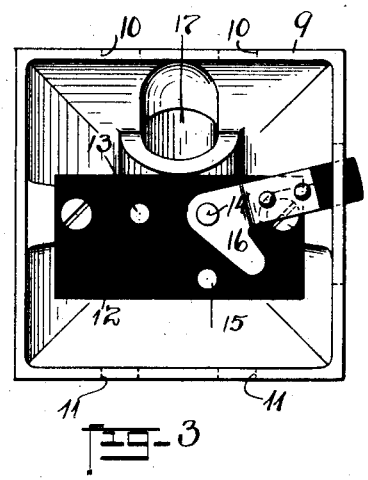
WITNESSES
Oliver M. Kappler.
Robert M. See
INVENTOR
Bernard A. Stowe
BY J. B. Fay
ATTORNEY B. A. STOWE.
SUPPORT FOR ELECTRIC TRANSLATING DEVICES.
APPLICATION FILED APR. 15, 1912.
1,040,452.
Patented Oct. 8, 1912.
2 SHEETS—SHEET 2.
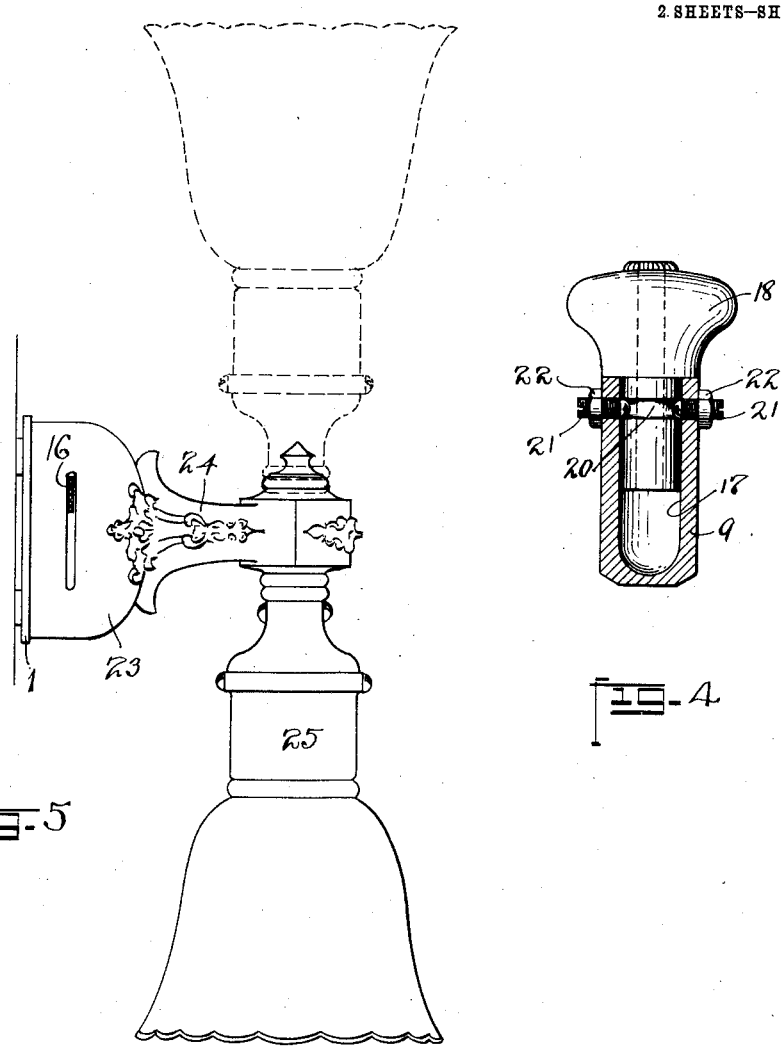
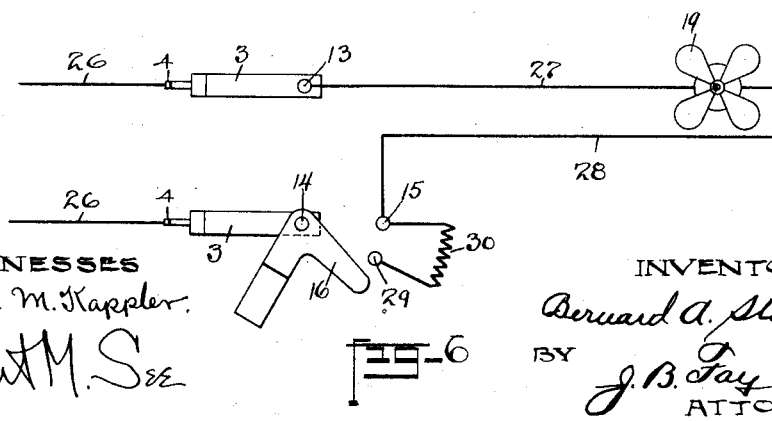
WITNESSES
Oliver M. Kappler.
Robert M. See
INVENTOR —
Bernard A. Stowe
BY
J. B. Fay
ATTORNEY

UNITED STATES PATENT OFFICE.

BERNARD A. STOWE, OF CLEVELAND, OHIO, ASSIGNOR TO THE ADAMS-BAGNALL ELECTRIC COMPANY, OF CLEVELAND, OHIO, A CORPORATION OF OHIO.

SUPPORT FOR ELECTRIC TRANSLATING DEVICES.

1,040,452.            Specification of Letters Patent.           Patented Oct. 8, 1912.

Application filed April 15, 1912. Serial No. 690,703.

*To all whom it may concern:*

Be it known that I, BERNARD A. STOWE, a citizen of the United States, and a resident of Cleveland, county of Cuyahoga, and State of Ohio, have invented a new and useful Improvement in Supports for Electric Translating Devices, of which the following is a specification, the principle of the invention being herein explained and the best mode in which I have contemplated applying that principle, so as to distinguish it from other inventions.

The present invention relates in general, to supports for electric fans, or electric lighting fixtures, or like electrically operated devices, and its particular object is to provide a satisfactory and efficient means for supporting such devices from walls or ceilings.

The well-known present practice regarding the installation of fans or the like, for instance, is to screw the fan to the wall, stand the device on a wall bracket or shelf, or on some piece of funiture, and connect it electrically with one of the sockets in an electrolier, or with a socket opening through the wall or base-board of the wall. When thus installed, the installations are very unsatisfactory because of the necessity for using electrical cables of greater or less length, leading from the electrolier or base-board socket to the device, such cable being not only unsightly, but forming an obstruction.

The present invention satisfactorily overcomes these and similar objections to present types of installations.

To the accomplishment of these and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—Figure 1 is a side elevation of a device embodying my invention, with an alternative position shown in dotted lines; Fig. 2 is a section on the line A—A in Fig. 1; Fig. 3 is an interior plan view of the holder; Fig. 4 is a section on the line B—B in Fig. 1; Fig. 5 is a side elevation of a device embodying my invention, modified in one particular; and Fig. 6 is a diagram of the electrical circuit employed.

The invention provides a base 1, which is designed to be relatively permanently secured to a wall or ceiling. The base 1 carries a plate 2, of insulating material, on which are mounted terminals 3, which are preferably recurved spring terminals, with which are connected points 4, designed to be relatively permanently connected with the leads 26 (Fig. 6) of an electric circuit. At opposite sides, the base 1 is provided with lugs 5, in which are secured outwardly extending pins 6, and with lugs 7, in which are mounted extensible members 8, which are preferably screws.

Bases similar to base 1, it is intended, shall be installed at suitable places in a room, as part of the permanent fixtures of the room, and when it is not desired to utilize any one base for the mounting of an electrical device, a suitable plain cover will be secured on the base, so that there will be nothing visible except an ornamental brass plate. When, however, it is desired to connect a fan or lighting fixture, or other device to the permanent base, the holder which forms part of this invention, will be used.

The holder 9, corresponds in shape with the base 1, and in its opposite sides are formed apertures 10 and 11, either pair of which will engage either the pins 6, or the screws 8, on the base 1, and in order to secure the holder to the base, it is only necessary to slip one of the sets of apertures over the pins, and to then extend the screws outwardly into the other apertures. The holder 9, carries a plate 12, of insulating material, on which are mounted terminals 13 and 14 adapted to contact with the terminals 3, secured to the base, such terminal 13, and another terminal 15, carried by plate 12, being connected with the fan motor or other device which may be mounted in the holder. A switch 16, its handle extending outside of the holder, may be mounted as shown on the terminal 14, and is adapted to connect or disconnect that terminal with the terminal 15, which is connected with the supported device. The holder is provided with a socket in which will be secured the fan or lighting fixture, or whatever appliance it may be designed to support. If it is desired to install a fan, the socket will preferably be such as is shown at 17 on Fig. 3, this socket opening through the outer face of the holder, and extending angularly with respect to the normal plane of the front face of the holder. The shank 18, of the motor casing 19, which incloses the motor and supports the fan, is inserted in the socket 17, and an annular depression 20, in the shank, is engaged by set screws 21, provided with lock nuts 22.

In Fig. 5 is shown a modified form of holder 23, the modification consisting simply in the different ornamental shape of the front face of the holder, and in the substitution of a straight socket for an angular socket.

The electrical circuit as diagramed in Fig. 6, consists of lead lines 26, connected with the terminals 3, and of leads 27 and 28, connecting terminals 13 and 15 with the motor of the fan 19, or with whatever device may be used. The terminal 14, on which is mounted the switch 16, is in contact with one of the terminals 3. Obviously by connecting or disconnecting the terminals 14 and 15, the switch 16, opens or closes the circuit between the permanent leads and the device to be controlled, and in certain installations it may be desirable to also incorporate in the circuit, an additional terminal 29, with a resistance 30, between it and the terminal 15. If such resistance is incorporated, it and the additional terminal will be carried by the holder, and the switch 16 will be designed to connect its terminal 14, with either the terminal 29 or 15 as desired.

The operation of the device of this invention, should be apparent from the preceding description, but its advantages may be briefly noted. When the connection at a certain base is not in use, there is no wall bracket or shelf to mar the appearance of the wall, and there are no unsightly screw holes in the wall, left from the screws which once attached a fan, or similar device, to the wall. In fact, only the ornamental brass plate used to cover the base will be visible.

When it is desired to mount the fan on the base, it is only necessary, the fan itself having been mounted in the holder, to secure the holder to the base. The fixture is then completely installed without any visible electrical connections, and without any unsightly supporting bracket. It will be noted that the holder may be secured to the base in either of two opposite positions. This is extremely useful in case of fans, for instance, where the overhead space is limited, and where it would not be possible to install the fixture as shown in full outline in Fig. 1, and still locate the holder 9 at an appropriate point on the wall, such point being determined by the wall surface which is ordinarily designed without regard to the subsequent installation of fixtures thereon. With the present construction, however, the base or holder 9 may be located where most appropriate, and if the fan cannot be attached thereto in the position illustrated in full lines, it can just as readily be supported in the opposite position which leaves ample clearance above.

When a lighting fixture is to be installed instead of a fan, it will usually be desirable to use a bracket arm, horizontally disposed instead of angularly disposed as in a fan installation, and the present invention, by reason of the alternative positions in which the holder may be secured to the base, allows the fixture to be installed either as an upwardly extending fixture, as shown in dotted outline in Fig. 5, or as a pendant fixture.

Although the present invention will probably find its greatest use in supporting electrical devices from the vertical walls of a room or railway car, for instance, it is not limited to such installation obviously, for it may equally well be attached to a ceiling.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A support for electric translating devices, comprising a base designed to be secured to a wall and provided with two terminals designed to be connected in an electric circuit; a holder, said base and holder being provided at their opposite sides, one with a pin and extensible member and the other with apertures respectively and alternatively engaging said pin and member; two terminals provided on said holder, one of the holder terminals being connected with one of the base terminals; and a switch provided on said holder and adapted alternatively to connect or disconnect the other holder terminal and the other base terminal.

2. A support for electric translating devices, comprising a base designed to be secured to a wall and provided with two terminals designed to be connected in an electric circuit and provided at opposite sides with a pin and an extensible member; a holder provided at opposite sides with apertures respectively and alternatively engaging said pin and member; two terminals provided on said holder, one of the holder terminals being connected with one of the base terminals; and a switch provided on said holder and adapted alternatively to connect or disconnect the other holder terminal and the other base terminal.

3. A support for electric translating devices, comprising a base designed to be secured to a wall and provided with two terminals designed to be connected in an electric circuit, and provided at opposite sides with a pin and an extensible member; a holder provided at opposite sides with apertures respectively and alternatively engaging said pin and member, said holder having a socket opening through its outer face and angularly disposed relatively to the normal face; two terminals provided on said holder, one of the holder terminals being connected with one of the base terminals; and a switch provided on said holder and adapted alternatively to connect or disconnect the other holder terminal and the other base terminal.

4. A support for electric translating devices, comprising a base designed to be secured to a wall and provided with two terminals designed to be connected in an electric circuit; a holder designed to be detachably secured to said base, one of the foregoing members being provided at opposite sides with a fixed and an extensible element respectively, and the other thereof being provided with elements adapted to engage with the elements on said first-named member; and two terminals provided on said holder, said holder terminals being adapted to be connected with the respective base terminals.

5. A support for electric translating devices, comprising a base designed to be secured to a wall and provided with two terminals designed to be connected in an electric circuit; a holder designed to be detachably secured to said base, one of the foregoing members being provided at opposite sides with a fixed and an extensible element respectively, and the other thereof being provided with elements adapted respectively and alternatively to engage with the elements on said first-named member; and two terminals provided on said holder, said holder terminals being adapted to be connected with the respective base terminals in each of the opposite positions of said holder.

6. A support for electric translating devices, comprising a base designed to be secured to a wall and provided with two terminals designed to be connected in an electric circuit, and provided at opposite sides with a pin and an extensible member; a holder provided at opposite sides with apertures respectively and alternatively engaging said pin and member, said holder having a socket opening through its outer face and angularly disposed relatively to the normal face; and two terminals provided on said holder, said holder terminals being adapted to be connected with the respective base terminals in each of the alternative positions of said holder.

7. In a device of the character described, the combination with a base; of a holder designed to be detachably secured thereto, one of the foregoing members being provided at opposite sides with a fixed and an extensible element, respectively, and the other thereof being provided with elements adapted to engage with the elements on said first-named member.

8. In a device of the character described, the combination with a base; of a holder designed to be detachably secured thereto, one of the foregoing members being provided at opposite sides with a fixed and an extensible element, respectively, and the other thereof being provided with elements adapted respectively and alternatively to engage with the elements on said first-named member.

9. In a device of the character described, the combination with a base; of a holder designed to be detachably secured thereto, one of the foregoing members being provided at opposite sides with a pin and an extensible member, and the other thereof being provided with apertures adapted to engage with the pin and extensible element on said first-named member.

10. In a device of the character described, the combination with a base; of a holder designed to be detachably secured thereto, one of the foregoing members being provided at opposite sides with a pin and an extensible member, and the other thereof being provided with apertures adapted respectively and alternatively to engage with the pin and extensible element on said first-named member.

Signed by me this 12 day of April, 1912.

BERNARD A. STOWE.

Attested by—
J. H. WOOBS,
H. M. McKOUGH.

---

Copies of this patent may be obtained for five cents each, by addressing the "Commissioner of Patents, Washington, D. C."